United States Patent
Lyon et al.

(10) Patent No.: US 9,871,897 B1
(45) Date of Patent: Jan. 16, 2018

(54) SENSOR STACK HAVING A GRAPHICAL ELEMENT FORMED BY PHYSICAL VAPOR DEPOSITION

(71) Applicant: Apple Inc., Cupertino, CA (US)

(72) Inventors: Benjamin B. Lyon, Cupertino, CA (US); Patrick E. O'Brien, Cupertino, CA (US); Scott A. Myers, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 639 days.

(21) Appl. No.: 14/480,115

(22) Filed: Sep. 8, 2014

Related U.S. Application Data

(60) Provisional application No. 61/875,537, filed on Sep. 9, 2013.

(51) Int. Cl.
| | | |
|---|---|---|
| *H01L 21/00* | (2006.01) | |
| *H04M 1/02* | (2006.01) | |
| *G06F 1/16* | (2006.01) | |
| *B32B 38/00* | (2006.01) | |
| *B32B 37/24* | (2006.01) | |
| *B32B 37/12* | (2006.01) | |

(52) U.S. Cl.
CPC ....... *H04M 1/0202* (2013.01); *B32B 37/1207* (2013.01); *B32B 37/24* (2013.01); *B32B 38/0012* (2013.01); *G06F 1/1626* (2013.01); *G06F 1/1684* (2013.01); *B32B 2037/246* (2013.01); *B32B 2307/20* (2013.01); *B32B 2457/16* (2013.01)

(58) Field of Classification Search
None
See application file for complete search history.

(56) References Cited

U.S. PATENT DOCUMENTS

| | | |
|---|---|---|
| 5,235,169 A | 8/1993 | Wakaumi et al. |
| 5,635,269 A | 6/1997 | Weir et al. |
| 5,880,430 A | 3/1999 | Wein |
| 6,518,544 B2 | 2/2003 | Aberle et al. |
| 7,272,483 B2 | 9/2007 | Tuschel et al. |
| 7,875,414 B2 | 1/2011 | Sawada et al. |

(Continued)

FOREIGN PATENT DOCUMENTS

| | | |
|---|---|---|
| DE | 4106151 | 11/1991 |
| FR | 2975617 | 11/2012 |

(Continued)

*Primary Examiner* — Angel Roman

(74) *Attorney, Agent, or Firm* — Brownstein Hyatt Farber Schreck, LLP

(57) ABSTRACT

Apparatuses and methods for creating a sensor stack or element for use in an electronic device. In one example, a method may include providing a substrate made of sapphire; affixing, by physical vapor deposition, a decorative feature on the substrate; providing a silicon layer including a capacitive sensor; and bonding the sensor to the substrate. In one example, the affixing operation may include an icon, logo, symbol or other graphic as the decorative feature. The method may also include reducing the substrate or silicon layer from an initial thickness to a second thickness, the second thickness being thinner that the initiation thickness. The sensor stack may be used or configured as an input button for the electronic device such as a mobile phone, tablet computer, or other computing device.

20 Claims, 5 Drawing Sheets

(56) References Cited

U.S. PATENT DOCUMENTS

| | | | |
|---|---|---|---|
| 7,975,913 | B2 | 7/2011 | Kubota et al. |
| 8,330,122 | B2 | 12/2012 | Smith et al. |
| 8,424,751 | B2 | 4/2013 | Liu et al. |
| 8,534,540 | B2 | 9/2013 | Gratton et al. |
| 8,715,725 | B2 | 5/2014 | Stuck et al. |
| 9,679,187 | B2 * | 6/2017 | Bhagavat ............ G06K 9/00053 |
| 2009/0171654 | A1 | 7/2009 | Spain |
| 2010/0054287 | A1 | 3/2010 | Ghauri |
| 2013/0118048 | A1 | 5/2013 | Kawanami |
| 2013/0341400 | A1 | 12/2013 | Lancaster-Larocque |
| 2014/0061172 | A1 | 3/2014 | Kuo |
| 2014/0338191 | A1 * | 11/2014 | Petcavich ............... G06F 3/044 29/846 |
| 2015/0363629 | A1 * | 12/2015 | Lee ..................... G06K 9/0002 345/173 |
| 2015/0367443 | A1 | 12/2015 | Nashner et al. |

FOREIGN PATENT DOCUMENTS

| | | |
|---|---|---|
| JP | H09296589 | 11/1997 |
| JP | 2001270300 | 10/2001 |

\* cited by examiner

SENSOR STACK HAVING A GRAPHICAL ELEMENT FORMED BY PHYSICAL VAPOR DEPOSITION

CROSS-REFERENCE TO RELATED APPLICATION

This application is a nonprovisional patent application of U.S. Provisional Patent Application No. 61/875,537, filed Sep. 9, 2013 and titled "Capacitive Sensors Having Physical Vapor Deposition (PVD) Layer with a Graphical Element, and Methods for Forming Same," the disclosure of which is hereby incorporated by reference herein in its entirety.

TECHNICAL FIELD

This disclosure relates generally sensor elements in electronic devices, and more particularly relates to sensor elements that sense a user's touch on a surface of the electronic device.

BACKGROUND

Many devices use sensors to detect environmental conditions and may be used as input for the device. For example, a device may include a capacitive touch sensor integrated with a touch screen, which may accept touch input from a user. However, it may be challenging to integrate a touch sensor into a mechanical switch or button. Some traditional buttons are formed from a thick material that may be difficult to integrate with a touch sensor. Additionally, buttons may include decorations or glyphs that may not be compatible with touch sensor forming processes.

Accordingly, there is a need for systems and techniques that integrate a touch sensor into a push button or other similar element of a device.

SUMMARY

One example embodiment is directed to a method for creating a sensor stack for use in an electronic device. The method may include affixing, by physical vapor deposition, a decorative feature on a substrate formed from a sapphire material and bonding a silicon layer to the substrate, the silicon layer including a capacitive touch sensor, and thinning at least one of the silicon layer and the substrate. In some cases, the substrate of the sensor stack forms a touch-sensitive surface. In some cases, the sensor stack is configured to be used to identify a fingerprint. The sensor chip may be used or configured as an input button for the electronic device such as a mobile phone, tablet computer, or other computing device.

In one example, the affixing operation may include forming an icon, logo, symbol or other graphic as the decorative feature. The bonding operation may include curing an adhesive between the silicon layer and the substrate. In one example, the method may also include reducing the silicon layer from an initial thickness to a second thickness, the second thickness being smaller that the initial thickness.

According to another broad aspect of the present disclosure, disclosed herein is a method for creating a sensor chip. In one embodiment, the method may include providing a substrate; affixing, by physical vapor deposition, a decorative feature on the substrate; providing a silicon layer including a sensor; and bonding the sensor to the substrate.

According to another embodiment of the present disclosure, disclosed herein is an electronic device which may include a processor, and a sensing element in communication with the processor, the sensing element comprising a substrate, a decorative layer physically vapor deposed onto the substrate, and a silicon layer attached to the substrate, the silicon layer having a sensor.

In one example, the electronic device may also include a display in communication with the processor, the display comprising a cover; and a visual output element, wherein the sensing element is connected to the cover. In another example, the electronic device is configured to include an input button, wherein the sensing element is configured to detect a user input to the input button. The sensor may be a capacitive sensor, and the substrate may include a sapphire material in some embodiments.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

DETAILED DESCRIPTION

Disclosed herein are various embodiments of sensing elements or chips (such as, but not limited to, capacitive sensor chips) and methods for forming such sensing elements or sensor stacks, which may be used in various electronic devices such as mobile phones, tablet computers, music and multi-media players, wearable devices, gaming devices, and other handheld, wearable or portable devices.

In one example, a substrate is formed using a sapphire, plastic or glass material. A physical vapor deposition (PVD) processes may be used to form a decorative feature by applying a cosmetic or graphical feature to the substrate. The decorative feature may include graphics, icons, symbols, letters, numbers, product logos, or other indicia (for example but not limited to an outline of a symbol for a home button). In one example, a silicon layer is bonded to the substrate portion. The silicon layer may include one or more circuit elements, electrodes, sensors, circuitry, logic, electrical connections, or combinations thereof. In one example, the silicon layer is a capacitive touch sensor. In particular, the silicon layer may include portions of a fingerprint recognition sensor. The stack formed from the substrate, decorative feature, and silicon layer may be thinned if desired, and also cut or diced as desired. The thinned and diced stack may be used to form one or more sensing elements that can be integrated into a button or other elements of an electronic device. In some cases, the substrate of the stack forms a touch-sensitive surface. The touch-sensitive surface may be used to identify a fingerprint of the user.

Figure 1:
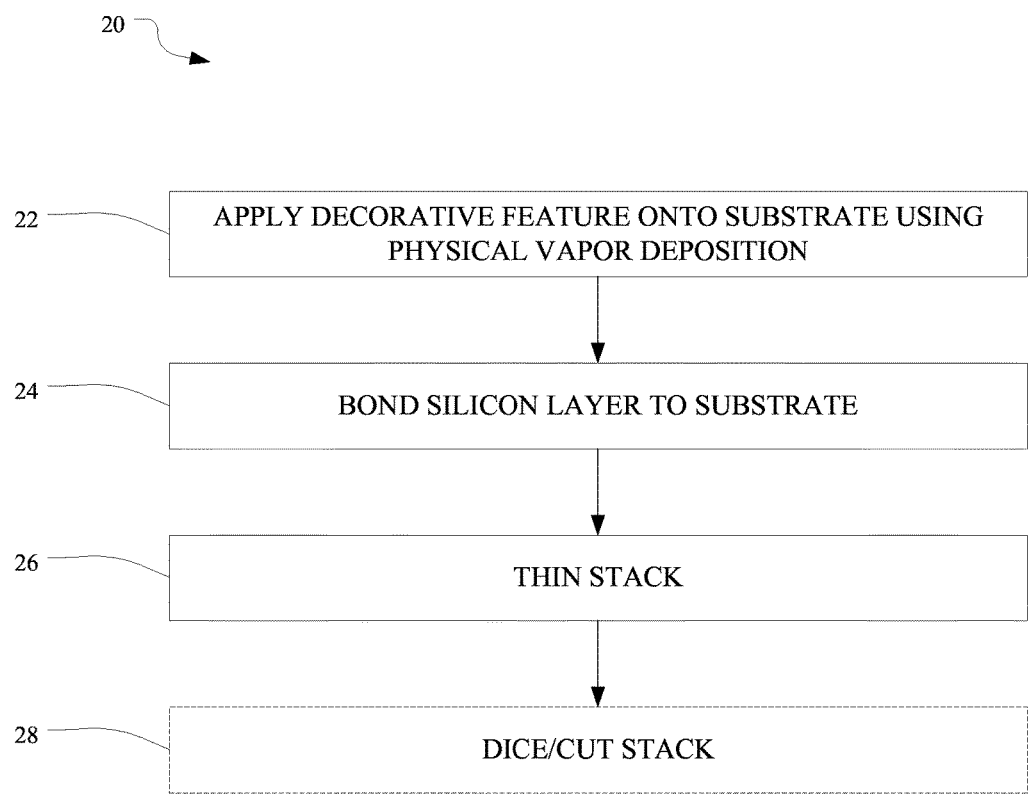
FIG. 1 depicts a flow chart of an example of process for forming a sensing element, in accordance with one embodiment of this disclosure.

Referring to FIG. 1 depicts an example process 20 for forming a sensor stack. Reference is also made to FIGS. 2A-2E, which depict the various stages of forming the example sensor stack 10 (also referred to herein as sensing element 10). In the present example, the sensor stack 10 is formed, in part, from a substrate 30. The substrate 30 may be made from glass (which may be chemically strengthened), plastics, polymers, or sapphire or other similar material. The substrate 30 may be cut, ground, and/or polished, as needed, in preparation for forming the sensor stack 10. In some embodiments, the substrate 30 may form the top layer of a component or element of a device. For example, the substrate 30 may form the top layer of a button, key, or other input element. In one example embodiment, the substrate material 30 may form a clear or translucent layer overlying a viewable element of an electronic device, such as a display. In another embodiment, the substrate 30 may form a portion of a housing or protective shell for an electronic device.

Figure 2A:
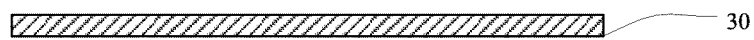
FIGS. 2A-2E depict example stages of formation of a sensing element, in accordance with one embodiment of this disclosure.
Figure 2B:

With reference to FIG. 1, at operation 22, a decorative feature is applied or affixed to substrate. With reference to FIG. 2B, a physical vapor deposition process may be used to form the decorative feature 32 on a surface of the substrate 30. The decorative feature 32 may include graphics, icons, symbols, letters, numbers, product logos, or other indicia, for example but not limited to an outline of a symbol for a home button, a power button, or other function button. The decorative feature 32 may also include a solid drawing of the feature, a line drawing of the feature, an outline of the feature, or include another type of graphical depiction.

With reference to FIG. 1, in operation 22, a physical vapor deposition process may include a vacuum deposition method used to deposit a thin film. The thin film may form the decorative feature by condensation. In one example, a vaporized form of the film material is exposed to the substrate to form the film. An example physical vapor deposition process may utilize high-temperature vacuum evaporation with subsequent condensation to affix the decorative feature onto the substrate. In some embodiments, the decorative feature may be a solid ink layer that may be evenly and smoothly deposited through physical vapor deposition. Further, the dimensions of the ink layer may be controlled through physical vapor deposition to maintain a relatively uniform and small thickness. In one example, the thickness of the decorative feature is approximately 20-100 microns. In another example, the thickness of the decorative feature is less than 20 microns.

Figure 2C:
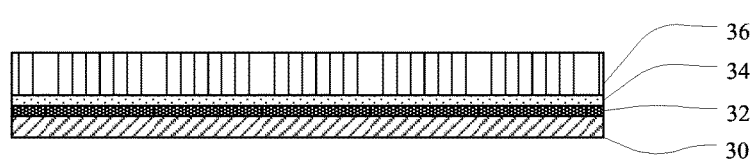

In operation 24, a silicon layer is bonded to the substrate. In particular, the silicon layer may be bonded to the same surface of the substrate on which the decorative feature has been applied or affixed. With reference to FIG. 2C the silicon layer 36 may be bonded to a surface of the substrate 30 using an adhesive 34 or other suitable wafer-to-wafer bonding. Adhesive 34 may be any suitable adhesive. As one example, the adhesive 34 may be a heat-cured adhesive to provide a strong bond between the substrate 30 and the silicon layer 36. In some cases, the use of a heat-cured adhesive may adversely affect some traditional inks that may be used to create a decorative layer. However, using a PVD process to form or affix a thin film to create the decorative feature 32 may survive such temperatures. Thus, the present embodiment using a PVD process may be advantageous, in certain embodiments.

With reference to FIG. 2C, the silicon layer 36 may include one or more sensors or sensor arrays, circuit elements (such as capacitive elements), circuitry, logic, electrical connections, or combinations thereof. In one example, the silicon layer 36 forms part of a capacitive sensor. In particular, the silicon layer 36 may include a portion of a fingerprint recognition sensor for detecting recognizing a fingerprint. Within the silicon layer, an electrode layer may be electrically coupled to a circuit layer using one or more through silicon vias (TSVs) formed in an intermediate layer. In some implementations, multiple TSVs formed in an intermediate layer may eliminate the need for a carrier for the sensing element. For example, a sensor array may be formed on one side of the silicon layer and control circuitry may be formed on an opposing side with the sensor array and the control circuit electrically connected through the TSVs of the intermediate layer.

The silicon layer 36 may be of differing thicknesses in different embodiments, for example, depending upon the implementation and particulars of any given embodiment. In one example, the silicon may be approximately 170 microns in thickness. The initial thickness of the silicon layer 36 may be limited by the structural or mechanical constraints on the part. For example, a silicon layer 36 that is too thin may not have the structural or mechanical integrity to withstand handling and other manufacturing processes. In addition, in certain embodiments the area defined by the substrate 30 may be larger than the area defined by the silicon layer 36 prior to forming the sensor stack 10. For example, the substrate 30 may be formed in a circle shape while the silicon layer 36 is formed in a square shape that is sized to fit within the circle. A diagonal of the silicon layer 36 may be approximately equal in size to a diameter of the substrate 30.

Returning to FIG. 1, at operation 26, the stack may be thinned to achieve a final thickness. In one example, the substrate is thinned to form a touch-sensitive surface. In another example, the silicon layer is thinned in addition to or alternative to thinning the substrate. As previously mentioned, the thickness of individual components, such as the silicon layer, may be limited by the strength of the material. If the individual layers are formed too thin, they may lack the strength or structural integrity to withstand handling and/or manufacturing processes. However, once the components have been integrated together, the stack may be thinned.

Figure 2D:
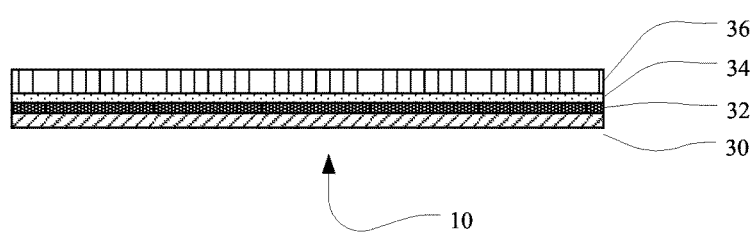

With reference to FIG. 2D, the stack may be thinned using, for example, a back-grinding process. In the present example, both the substrate 36 and the silicon layer 36 are thinned after being integrated into the stack 10. In other examples, only the substrate 36 or only the silicon layer 36 are thinned by operation 26. In some implementations, the thickness of the substrate 30 and/or the silicon layer 36 may be reduced to a level potentially unobtainable if the substrate 30 and/or the silicon layer 36 were thinned prior to forming the stack 10. In some cases, because the silicon layer 36 and the substrate 30 provide structural support for each other, thickness of the substrate 30 or the silicon layer 36 may be reduced past the point where the component would snap or structurally fail if it were thinned without such support. As one non-limiting example, the substrate 30 may be background to a 20-100 micron thickness after being integrated into the stack. In another example, the substrate 30 is ground to a thickness of less than 20 microns.

By thinning the substrate 30, the operation of a sensor formed in the silicon layer 36 may be enhanced. In some embodiments, the sensor in the silicon layer 36 may operate through the substrate 30. For example, an electric field may be projected from the silicon layer 36 and through the substrate 30 in order to sense a touch or obtain biometric information from a user that is touching or near the opposite side of the substrate. Generally, the accuracy and reliability of most sensors falls off as distance to a sensed target increases. This may be particularly true of capacitive sensors, as the sensitivity of a capacitive sensor is inversely proportional to the square of the distance between the sensor and the sensed object. Furthermore, the sensitivity of a capacitive fingerprint recognition sensor, which may rely on electric fields to generate an image of the fingerprint, may be particularly critical for optimal performance. Thus, reducing the thickness of the substrate 30 may enhance operation of at least some types of sensors and may permit better resolution images and/or reliable touch sensing.

In some embodiments, the substrate 30 may not be back-ground but instead (or additionally) the silicon layer 36 may be thinned in much the same fashion as described above. That is, in some cases, it may be advantageous to thin the silicon layer 36 after the stack 10 has been formed. Furthermore, either the silicon layer 36 or the substrate 30 may be thinned through any suitable grinding process, polishing, selective etching, and so on.

Figure 2E:
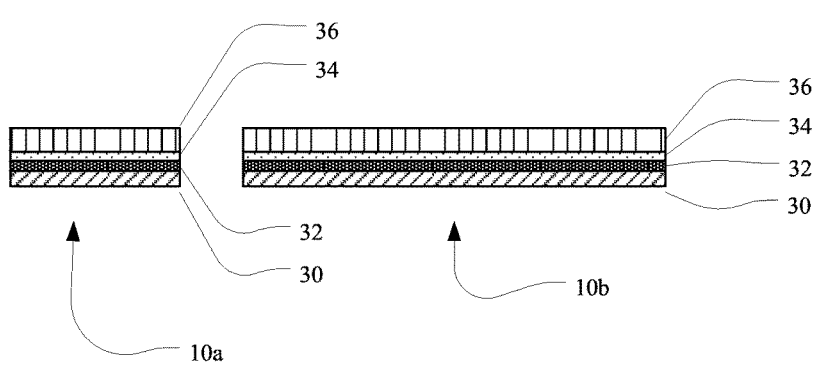

Returning to FIG. 1, at operation 28, the stack formed by operations 22-26 may be diced or cut to the desired die size using dicing mechanisms and processes. As indicated by the dashed lines of FIG. 1, operation 28 may be optionally performed. With reference to FIG. 2E, the stack 10 may be diced or cut to form one or more individual components 10a, 10b. In some cases, the stack 10 may be diced or cut to form a final sensor component that is configured to integrate into another component or element of a device. In one example, the stack may be integrated with a button, switch, touch input element or other input for an electronic device. The circuits or other electronics of the silicon layer 36 of the stack 10 may also be connected with other circuits or components of the electronic device.

Further, the operations of process 20 depicted in FIG. 1 may be adapted for a mass-scale manufacturing of sensing elements, in accordance with an embodiment of this disclosure. In particular, the order of the operations of the process 20 may be performed in a sequence that is different than the order of the discussion, above. For example, the decorative feature 32 may be applied to the substrate 30 prior to cutting, grinding, and/or polishing the substrate 30. Likewise, the silicon layer 36 may be applied prior to these operations.

In one embodiment, a single substrate sheet (e.g., sapphire sheet) may have decorations and silicon sensors mated thereto before the individual components (e.g., button, cover glass, etc.) are cut from the substrate sheet. In this case, the substrate sheet may be handled much like a glass or substrate that is used to create, for example display screens. In some cases, this may result in faster production of pieces and/or economies of scale during manufacturing.

Figure 3:
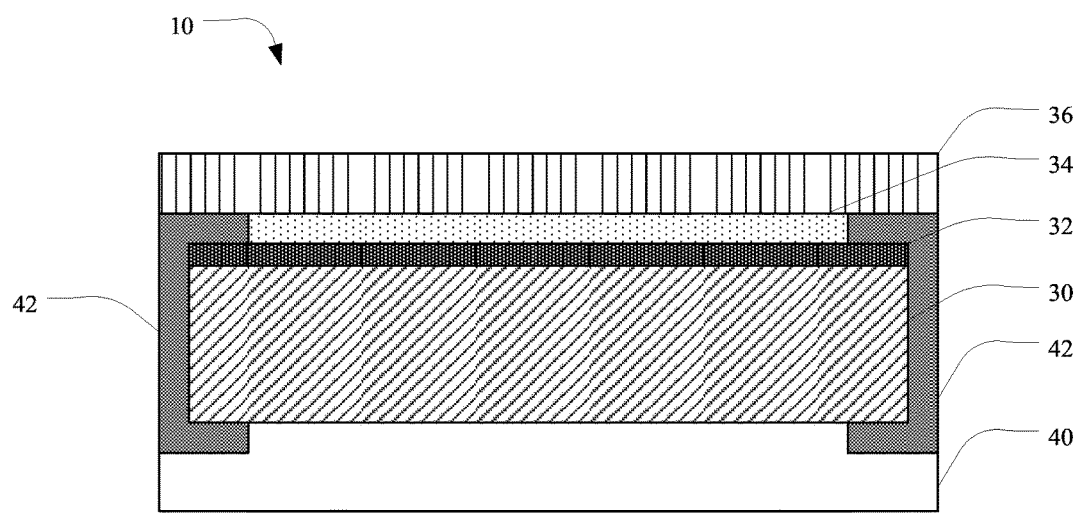
FIG. 3 depicts an example of a sensing element including a ground ring, in accordance with one embodiment of this disclosure.

Referring to FIG. 3, a sensing element 10 (also referred to as stack 10) may also include a ground ring 42 that wraps around one or more edges or sides of the sensing element 10. The ground ring 42 may be used to ground a user touching the sensor element 10, or may provide a ground path for other electrical components within the electronic device. During manufacturing, the ground ring 42 may be integrally formed and/or electrically connected, including during large-scale manufacturing operations. The ground ring 42 may be made of metal or other conductive material or conductive film.

As one example, the ground ring 42 may be deposited on or around the substrate 30, the decorative layer 32, and/or the silicon layer 36 through a PVD process similar to that used to create the decorative layer 32. The metal of the ground ring may be built up on and/or around the substrate 30 through physical vapor deposition, by successively depositing fine metalized layers. By depositing the ground ring 42 through a PVD process, the shape, thickness and location of the ground ring 42 may be finely controlled. This may eliminate the need for a flex circuit or other electrical connection between the ground ring 42 and the silicon layer 36 or another electrical component within an electronic device. For example, an electrical contact (such as a pin or a pad) may be formed at or on an edge of the silicon layer 36. The ground ring 42 may be connected to the electrical contact as it is deposited on or about the substrate 30. In such fashion, the formation of the ground ring 42 likewise forms the contact with the silicon layer 36. Additionally, a protective film 40 may be applied to an outer surface of the substrate to help protect the glass/sapphire substrate 30.

Figure 4:
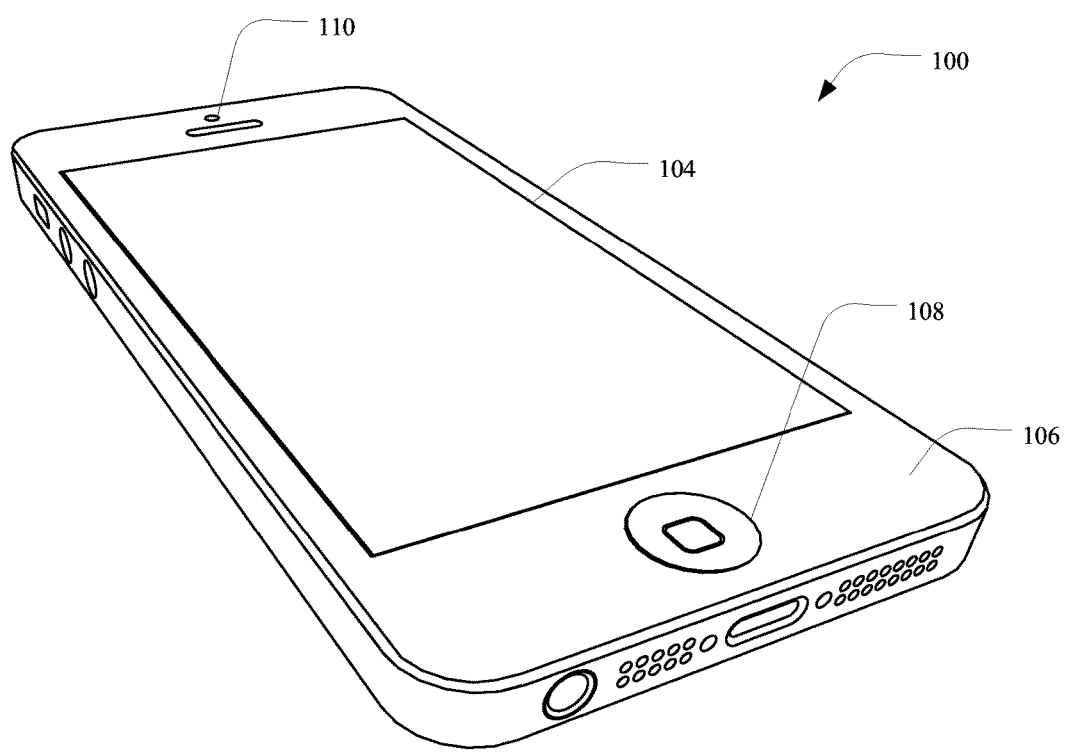
FIG. 4 depicts a perspective view of an example of an electronic device including a sensing element, in accordance with one embodiment of this disclosure.
Figure 5:
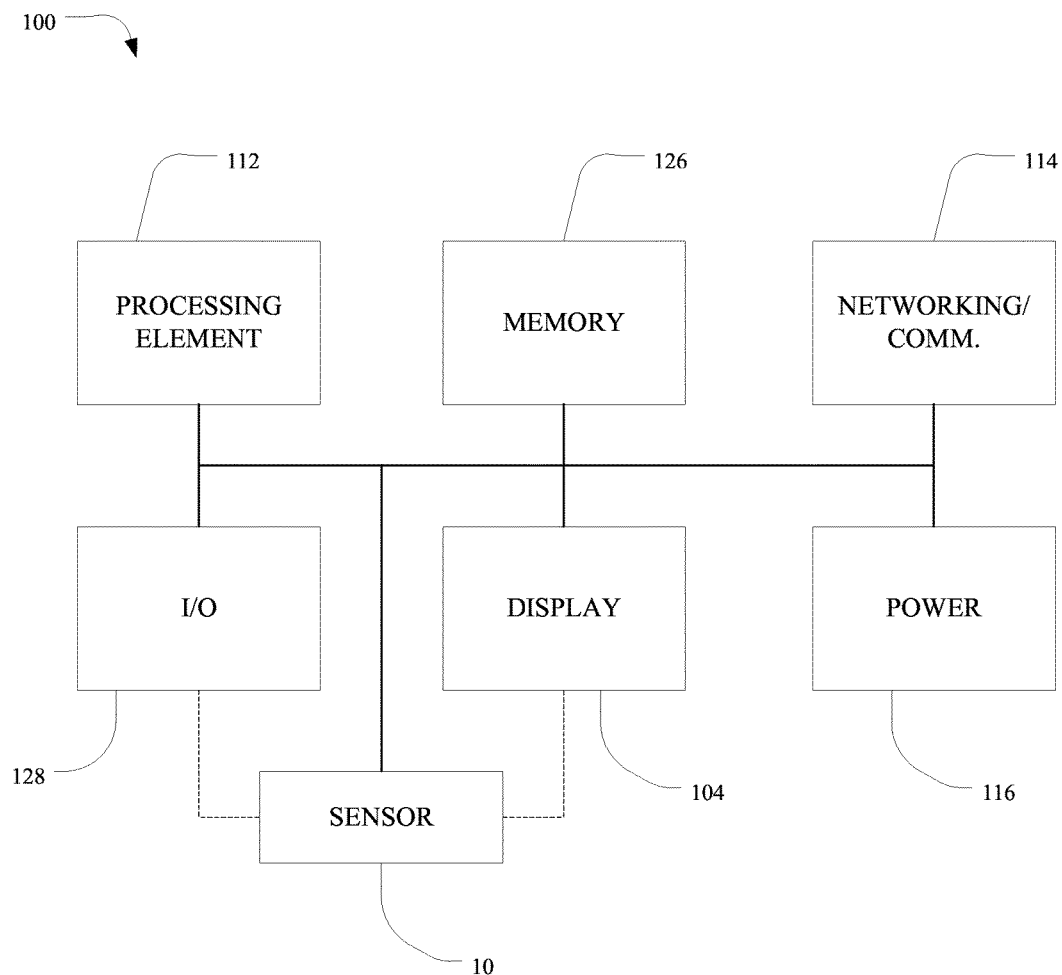
FIG. 5 depicts a simplified block diagram of an example of the electronic device of FIG. 4, in accordance with one embodiment of this disclosure.

FIGS. 4-5 illustrate an example implementation of a sensing element in accordance with an embodiment of the disclosure. A sensor element 10 and an illustrative electronic device 100 for incorporating the sensor element 10 will be discussed in more detail.

The present description of the electronic device 100 is provided as an example and is not intended to be limiting. The electronic device 100 may include a display 104, an enclosure 106, one or more input and/or output members 108, and a camera 110. It should be noted that the electronic device 100 may include a plurality of other components, such as a speaker, one or more ports (e.g., charging port, data transfer port, or the like), additional input/output buttons, and so on. The electronic device 100 may be substantially any type of device incorporating a sensor or sensing element. Some examples of electronic devices may include a computer, laptop, tablet, smart phone, digital camera, printer, scanner, copier, glasses, other portable wearable devices, media players, security systems or devices, automobiles or electronics for automobiles, and so on.

The display 104 may be operably connected to the electronic device 100 or may be communicatively coupled thereto (e.g., a standalone monitor in communication with a computer). The display 104 may provide a visual output for the electronic device 100 and/or may function to receive user inputs to the electronic device 100. For example, the display 104 may be a multi-touch capacitive sensing screen that may detect one or more user inputs. The display 104 may include a cover (e.g., a cover sheet or cover glass) and a visual output element (e.g., liquid crystal display element, organic light emitting diode element) that is configured produce a visual output. In some cases, a sensor stack or sensing element may be integrated with the display 104.

With reference to FIG. 4, the enclosure 106 may form an outer surface or partial outer surface and protective case for the internal components of the electronic device 100 and may at least partially surround the display 104. The enclosure 106 may be formed of one or more components operably connected together, such as a front piece and a back piece, or may be formed of a single piece operably connected to the display 104.

The input member 108 (which may be a switch, button, capacitive sensor, or other input mechanism that utilizes a sensing element) may be configured to receive user input or interactions with the electronic device 100. For example, the input member 108 may be a button or switch that can be used to alter the volume, return to a home screen, or facilitate other functionality. The electronic device 100 may include one or more input members 108 and/or output members, and each member may have a single input or output function or multiple input/output functions. In some embodiments, the input member 108 may include output functionality in addition to the input capabilities. As a specific example, the input member 108 may include one or more mechanisms for providing haptic feedback.

In some embodiments, the upper or outer surface of the input member 108 (e.g., the surface with which a user interacts) may be formed from the substrate (FIG. 3, item 30) portion of a stack (FIG. 3, item 10) and the sensor (FIG. 3, item 36) may be located beneath the input member. The PVD decorative layer may hide or mask the silicon from direct view by the user. Further, the silicon may operate through the decorative layer and the substrate to interact with a user, for example by sensing a touch or capturing a biometric image (such as a fingerprint) when the user interacts with the input member.

With reference to FIG. 5, the electronic device 100 may also include a number of active components that may be disposed within the enclosure 106 or otherwise hidden from a user. The electronic device 100 may also include one or more processing elements 112, a storage or memory component 126, an input/output interface 128, a power source 116, and one or more sensors 10, each will be discussed in turn below.

The processor or processing element 112 may control one or more functions and/or operations of the electronic device 100. The processing element 112 may be in communication, either directly or indirectly, with substantially all of the components of the electronic device 100. For example, one or more system buses or other communication mechanisms may provide communication between the processing element 112, the camera 110, the display 104, the input member 108, the sensors 120, and so on. The processing element 112 may be any electronic device cable of processing, receiving, and/or transmitting instructions. For example, the processing element 112 may be a microprocessor or a microcomputer. As described herein, the terms "processor" and "processor element" are meant to encompass a single processor or processing unit, multiple processors, or multiple processing units, or other suitably configured computing element.

The memory 126 may include one or more storage or memory components that store electronic data that may be utilized by the electronic device 100. For example, the memory 126 can store electrical data or content e.g., audio files, video files, document files, and so on, corresponding to various applications. The memory 126 may be, for example, non-volatile storage, a magnetic storage medium, optical storage medium, magneto-optical storage medium, read only memory, random access memory, erasable programmable memory, or flash memory.

The network/communication interface 114 may provide connection to one or more connection or networking systems for the electronic device 100 and/or facilitate transmission of data to a user or to other electronic devices. For example, the network/communication interface 114 may transmit data between the electronic device 100 and one or more networks (e.g., WiFi, Ethernet, Bluetooth), cellular networks, and so on. The type of communication network may depend on a variety of different requirements, design parameters, and so on, and as such the network/communication interface 114 may be modified as desired. In embodiments where the electronic device 100 is a phone, the network/communication interface 114 may be used to receive data from a network, or may be used to send and transmit electronic signals via a wireless or wired connection (Internet, WiFi, Bluetooth, and Ethernet being a few examples). In some embodiments, the network/communication interface 114 may support multiple network or communication mechanisms. For example, the network/communication interface 114 may pair with another device over a Bluetooth network to transfer signals to the other device, while simultaneously receiving data from a WiFi or other network.

The input/output interface 128 may receive data from a user or one or more other electronic devices. For example, the input/output interface 128 may determine user inputs to a touch-screen display or element, as well as user inputs to the one or more input members 108. Additionally, the input/output interface 128 may determine or facilitate output to one or more output devices, such as speakers, haptic devices, headphones, and the like.

The power source 116 may be substantially any device capable of providing energy to the electronic device 100. For example, the power source 116 may be a battery, a connection cable that may be configured to connect the electronic device 100 to another power source such as a wall outlet, or the like.

In addition to the sensor element 10, which will be discussed in more detail below, the electronic device 100 may include one or more other sensors that may be used to provide data to the electronic device. For example, the electronic device 100 may include one or more audio sensors (e.g., microphones), light sensors (e.g., ambient light sensors), gyroscopes, accelerometers, or the like. The sensors may be used to provide data to the processing element 112, which may be used to enhance or vary functions of the electronic device 100.

The sensor element 10 may be incorporated into a variety of different components within the electronic device 100 and/or may be used on its own to sense one or more characteristics or data. Some embodiments of the sensor element 10 may include one or more sensors, such as biometric capacitive sensors. In one example, the sensor element 10 includes a fingerprint recognition sensor that may be used to identify the fingerprint of a user.

Sensor element 10 may be combined with other sensors if desired. For instance, two sensors may be stacked vertically relative to one another, formed in wafers or layers that are bonded together. The sensors may be substantially any type of sensing element that may sense one or more parameters or data. As some illustrative examples, one or both of the sensors may be an image sensor including one or more light sensing elements, infrared sensor, capacitive sensor, ultrasonic sensor, micro-electromechanical systems (MEMS), accelerometers, or the like. As one specific example, a first sensor may be a capacitive sensor and the second sensor may be an image sensor. In such an embodiment, one or both sensors may be thinned in the manner described herein. Further, if the sensors are joined to one another prior to being affixed to the substrate, both sensors may be thinned, each from an opposing side of the conjoined sensor stack. In another example, a first sensor may be a capacitive sensor and may be substantially transparent and the second sensor may be an optical sensor and may sense optical characteristics after light waves have been transmitted through the first sensor.

Depending on the implementation, a substrate of the sensor 10 may be a translucent or transparent material or may be sufficiently thinned or have a sufficiently thin thickness to be translucent. As some examples, the substrate may be glass, sapphire, plastic or a suitable polymer, silicon, thermoplastic material, or the like. In some embodiments, the sensor element 10 may be connected to a variety of different components having different material properties that may function as a support or substrate for the sensor stack.

Hence, it can be seen that various embodiments of the present disclosure provide a sensing element that can be used as a button or other input element for an electronic device such as portable devices, mobile phone, tablet computers, game controllers, portable devices, watches, music and multi-media players, or other devices depending upon the implementation.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations is not a limitation of the present disclosure.

It should be appreciated that in the foregoing description of exemplary embodiments of the disclosure, various features of the disclosure are sometimes grouped together in a single embodiment, figure, or description thereof for the purpose of streamlining the disclosure and aiding in the understanding of one or more of the various aspects. This method of disclosure, however, is not to be interpreted as reflecting an intention that the claims require more features than are expressly recited in each claim. Rather, inventive aspects lie in less than all features of a single foregoing disclosed embodiment, and each embodiment described herein may contain more than one inventive feature.

While the disclosure is presented and described with reference to embodiments thereof, it will be understood by those skilled in the art that various other changes in the form and details may be made without departing from the spirit and scope of the disclosure.

What is claimed is:

1. A method for forming a sensor stack for use in an electronic device, comprising:
    affixing, by physical vapor deposition, a decorative feature on a first surface of a substrate formed from a sapphire material;
    bonding a silicon layer to the first surface of the substrate, the silicon layer comprising a capacitive touch sensor; and
    thinning the substrate after bonding the silicon layer to the substrate to form a touch-sensitive surface.

2. The method of claim 1, wherein the sensor stack is configured to identify a fingerprint placed on the touch-sensitive surface.

3. The method of claim 1, wherein the affixing operation includes forming one of: an icon and a logo as the decorative feature.

4. The method of claim 1, wherein the bonding operation includes heat-curing an adhesive disposed between the substrate and the silicon layer to bond the silicon layer to the substrate.

5. The method of claim 1, wherein thinning includes reducing the substrate from an initial thickness to a second thickness, the second thickness being thinner that the initial thickness.

6. A method for creating a sensor chip, comprising:
    affixing, by physical vapor deposition, a decorative feature on a substrate;
    bonding a silicon layer to the substrate, the silicon layer including a capacitive touch sensor.

7. The method of claim 6, wherein the substrate is formed from one of: a glass material and a sapphire material.

8. The method of claim 6, wherein the affixing operation includes forming one of: an icon and a logo as the decorative feature.

9. The method of claim 6, wherein the bonding operation includes curing an adhesive disposed between the substrate and the silicon layer to bond the silicon layer to the substrate.

10. The method of claim 6, wherein the capacitive touch sensor is a fingerprint sensor.

11. The method of claim 6, further comprising:
    after bonding the silicon layer to the substrate, reducing the substrate from an initial thickness to a second thickness, the second thickness being thinner than the initial thickness.

12. The method of claim 1, wherein the substrate is formed from one of: a glass material and a sapphire material.

13. The method of claim 1, wherein the capacitive touch sensor is a fingerprint sensor.

14. A method for forming a sensor stack for use in an electronic device, comprising:
    affixing, by physical vapor deposition, a decorative feature on a first surface of a substrate formed from a sapphire material;
    bonding a silicon layer to the first surface of the substrate, the silicon layer comprising a capacitive touch sensor; and
    thinning one of the substrate or the silicon layer after bonding the silicon layer to the substrate.

15. The method of claim 14, wherein the sensor stack is configured to identify a fingerprint placed proximate to the sensor stack.

16. The method of claim 14, wherein the affixing operation includes forming one of: an icon and a logo as the decorative feature.

17. The method of claim 14, wherein the bonding operation includes heat-curing an adhesive disposed between the substrate and the silicon layer to bond the silicon layer to the substrate.

18. The method of claim 14, wherein the thinning operation includes reducing one of the substrate and the silicon layer from an initial thickness to a second thickness thinner than the initial thickness.

19. The method of claim 14, wherein the substrate is formed from one of: a glass material and a sapphire material.

20. The method of claim 14, wherein the sensor stack is configured as a button for the electronic device.

* * * * *